United States Patent
Barrera Munoz et al.

(10) Patent No.: US 10,532,701 B2
(45) Date of Patent: Jan. 14, 2020

(54) REVERSIBLE LOAD FLOOR

(71) Applicant: Ford Global Technologies, LLC, Dearborn, MI (US)

(72) Inventors: Dario Jesus Barrera Munoz, Estado de Mexico (MX); Juan Manuel Gallardo Almiray, Santiago de Queretaro (MX); Sergio Alberto Vega Velazquez, Nicolas Romero (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/417,995

(22) Filed: Jan. 27, 2017

(65) Prior Publication Data
US 2018/0215326 A1  Aug. 2, 2018

(51) Int. Cl.
*B60R 13/01* (2006.01)
*B62D 43/10* (2006.01)
*B62D 43/00* (2006.01)

(52) U.S. Cl.
CPC .......... *B60R 13/011* (2013.01); *B62D 43/005* (2013.01); *B62D 43/10* (2013.01); *B60R 2013/016* (2013.01)

(58) Field of Classification Search
CPC ...... B62D 43/005; B62D 43/10; B60R 13/01; B60R 13/011; B60R 13/013; B60R 2013/01; B60R 2013/015; B60R 2013/016
USPC ........ 296/37.3, 37.2, 37.14, 37.16; 224/42.2, 224/42.12, 282, 486, 497, 498, 42.26, 544
See application file for complete search history.

(56) References Cited

U.S. PATENT DOCUMENTS

| | | | | |
|---|---|---|---|---|
| 4,516,706 A | * | 5/1985 | Niehaus | B62D 43/005 224/42.2 |
| 4,548,540 A | * | 10/1985 | Renfro | B62D 43/045 206/304 |
| 4,754,883 A | | 7/1988 | Grzywa | |
| 5,178,434 A | * | 1/1993 | Krebs | B60N 3/04 180/271 |
| 5,447,110 A | | 9/1995 | Brown | |
| 5,799,845 A | * | 9/1998 | Matsushita | B60R 5/04 224/42.14 |
| 6,003,921 A | * | 12/1999 | Tozuka | B62D 43/10 224/42.2 |
| 6,336,671 B1 | * | 1/2002 | Leonardi | B60R 5/04 224/42.13 |
| 6,905,155 B1 | * | 6/2005 | Presley | B60N 2/3011 296/37.2 |

(Continued)

FOREIGN PATENT DOCUMENTS

DE  10110335 A1  9/2002
DE  102011013291 A1  9/2012

*Primary Examiner* — Dennis H Pedder
(74) *Attorney, Agent, or Firm* — Vichit Chea; Brooks Kushman, P.C.

(57) ABSTRACT

A reversible load floor for a vehicle includes a first side defining a planar surface. The reversible load floor also includes a second side disposed opposite of the first side. The second side includes a container, which extends from the second side along a vertical axis at a center of a spare tire such that, in a first position, the first side is accessible via a cargo compartment and the container is disposed over the spare tire, and, in a second position, the first side extends across a top of the spare tire and the container is accessible via the cargo compartment.

20 Claims, 3 Drawing Sheets

(56) References Cited

U.S. PATENT DOCUMENTS

| | | | | |
|---|---|---|---|---|
| 6,926,348 B2 * | 8/2005 | Krueger | ............... | B60R 5/04 |
| | | | | 224/403 |
| 7,159,919 B2 * | 1/2007 | Brown | ............... | B60R 5/04 |
| | | | | 296/37.2 |
| 2006/0145501 A1 * | 7/2006 | Warner | ............... | B60R 5/04 |
| | | | | 296/37.3 |
| 2006/0261566 A1 * | 11/2006 | Mulvihill | ............... | A45C 11/00 |
| | | | | 280/47.131 |

\* cited by examiner

REVERSIBLE LOAD FLOOR

TECHNICAL FIELD

The present disclosure relates to removable load floors within a cargo compartment of a vehicle.

BACKGROUND

Cargo compartments within vehicles aid consumers in storing items during travel. Items may be stored on a load floor of the cargo compartment. The load floor is parallel with the vehicle floor and defines an area equal to an area of the cargo compartment. Items of all sizes can be placed and stored on the load floor of the cargo compartment during travel. Cargo compartments are usually disposed in a rear portion of a vehicle and are separated from the cabin by a barrier, such as rear seats. Some cargo compartments are adjustable and can change the interior configuration of the cargo compartment or load floor to more efficiently secure items for travel.

SUMMARY

A cargo compartment for a vehicle includes a reversible load floor having first and second sides. The first side is disposed opposite the second side. The second side includes a container having a diameter greater than a diameter of a spare tire such that the spare tire fits within the container in a first position and extends vertically into the cargo compartment in a second position.

A vehicle includes a cargo compartment disposed within a rear portion having two sidewalls. The cargo compartment is disposed above a spare tire of a vehicle. A load floor is disposed within and configured to be removed from the cargo compartment. The load floor has a flat, planar first side disposed opposite of a second side having a container extending vertically from the second side. The container defines a diameter greater than a diameter of the spare tire such that, in a first position, the spare tire is disposed within the container, and, in a second position, the container extends into the cargo compartment.

A reversible load floor for a vehicle includes a first side defining a planar surface. The reversible load floor also includes a second side disposed opposite of the first side. The second side includes a container, which extends from the second side along a vertical axis at a center of a spare tire such that, in a first position, the first side is accessible via a cargo compartment and the container is disposed over the spare tire, and, in a second position, the first side extends across a top of the spare tire and the container is accessible via the cargo compartment.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
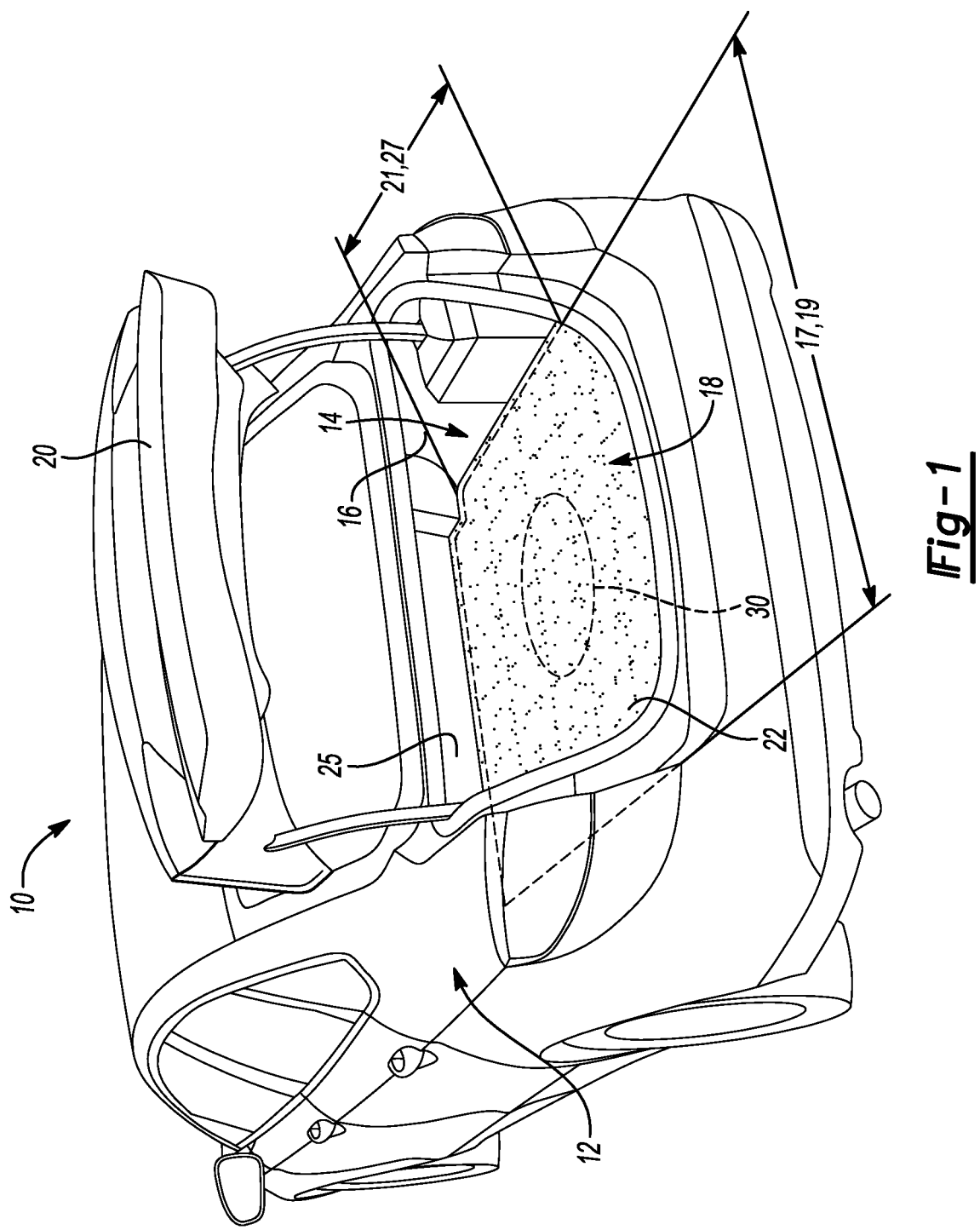
FIG. 1 is a perspective view of a vehicle having a cargo compartment in a rear portion of the vehicle.

Referring to FIG. 1, a perspective view of a vehicle 10 is shown. The vehicle 10 has a rear portion 12 defining a cargo area 14. The cargo area 14 is constrained by at least two sidewalls 16 of the rear portion 12 of the vehicle 10 and a load floor 18. The cargo area 14 may also be referred to as a cargo compartment herein. The load floor 18 is oriented substantially perpendicular to the at least two sidewalls 16. The load floor 18 is accessible by opening the rear portion 12 of the vehicle 10 via a hatch 20. Opening the hatch 20 allows the cargo area 14 to store items upon the load floor 18 during travel. Certain items, such as paint, may shift on the load floor 18 during use of the vehicle 10. When an item, such as a can of paint, shifts across the load floor 18, the item may spill its contents and damage the load floor 18. This may cause unsightly staining on the load floor 18. Utilization of a first side 22 and a second side 24 of the load floor 18 as described herein for item organization and storage may be advantageous.

As will be described with reference to the figures below, the load floor 18 may be configured to be removed from the cargo area 14. Applying a vertical force, such as lifting, to the first side 22 of the load floor 18 or the second side 24 of the load floor 18 allows the load floor 18 to be removed from the cargo area 14. Once removed from the cargo area 14, the load floor 18 may be flipped and repositioned within the cargo area 14. For example, in a first position the first side 22 is accessible via the hatch 20 as described above. In another example, in a second position the second side 24 of the load floor 18 may be accessible via the hatch 20. The first side 22 is disposed opposite and parallel to the second side 24. Therefore, if the first side 22 is accessible via the hatch 20, then the second side 24 is facing and in contact with a spare tire 30. Likewise, if the second side 24 is accessible via the hatch 20, then the first side 22 is facing and in contact with the spare tire 30. In this way, the load floor 18 may reversible which allows accessibility to either the first side 22 or the second side 24.

Removing the load floor 18 allows the load floor 18 to be reversible. As stated above, the load floor 18, when subjected to a vertical force, can be removed from the cargo area 14. The load floor 18 defines a width 17 substantially equal to a width 19 of the cargo area 14. The width 19 of the cargo area 14 may be defined as the distance between each of the sidewalls 16. When the load floor 18 defines the width 17 equal to, or substantially equal to the width 19 of the cargo area 14, the load floor 18 fits between each of the sidewalls 16. Also, if the width 17 of the load floor 18 fits between the sidewalls 16 with very little clearance, then the load floor 18 is prevented from shifting when a horizontal force is acting on the rear portion 12 of the vehicle 10.

The load floor 18 may define a length 21 substantially equal to a length of the cargo area 14. The length of the cargo area 14 may be defined as a distance between a rear panel 25 and a rearward portion of the hatch 20 when in a closed position. Therefore, the length 21 of the load floor 18 may fit within the cargo area 14 substantially along a length 27 of each of the sidewalls 16. Therefore, the length 21 of the load floor 18 may also be substantially equal to the length 27 of each of the sidewalls 16. If the length 21 of the load floor 18 is bounded by the rear panel 25 and the rearward portion of the hatch 20, then the load floor 18 is prevented from sliding vertically when the vehicle is subject to a vertical force. Constraining the load floor 18 vertically and horizontally via the length 21 and the width 17 allows the load floor to be removed as well as secures the load floor within the cargo area 14.

As stated above, a reversible load floor 18 may allow for further organization and storage of certain items during use of the vehicle 10. For example, the first side 22 may define a flat, planar surface to store larger objects requiring more space within the cargo area 14. The second side 24 may be configured to store other items, such as paint, which is subject to tipping, spilling and staining the load floor 18. Therefore, when items that may spill or stain the load floor 18 are needed for travel, the second side 24 of the load floor 18 may be accessible via the hatch 20. Being reversible, such that both the first side 22 and the second side 24 are accessible, provides the load floor 18 with further adaptability to store and secure items in the cargo area 14 defined in the rear portion 12 of the vehicle 10.

Figure 2A:
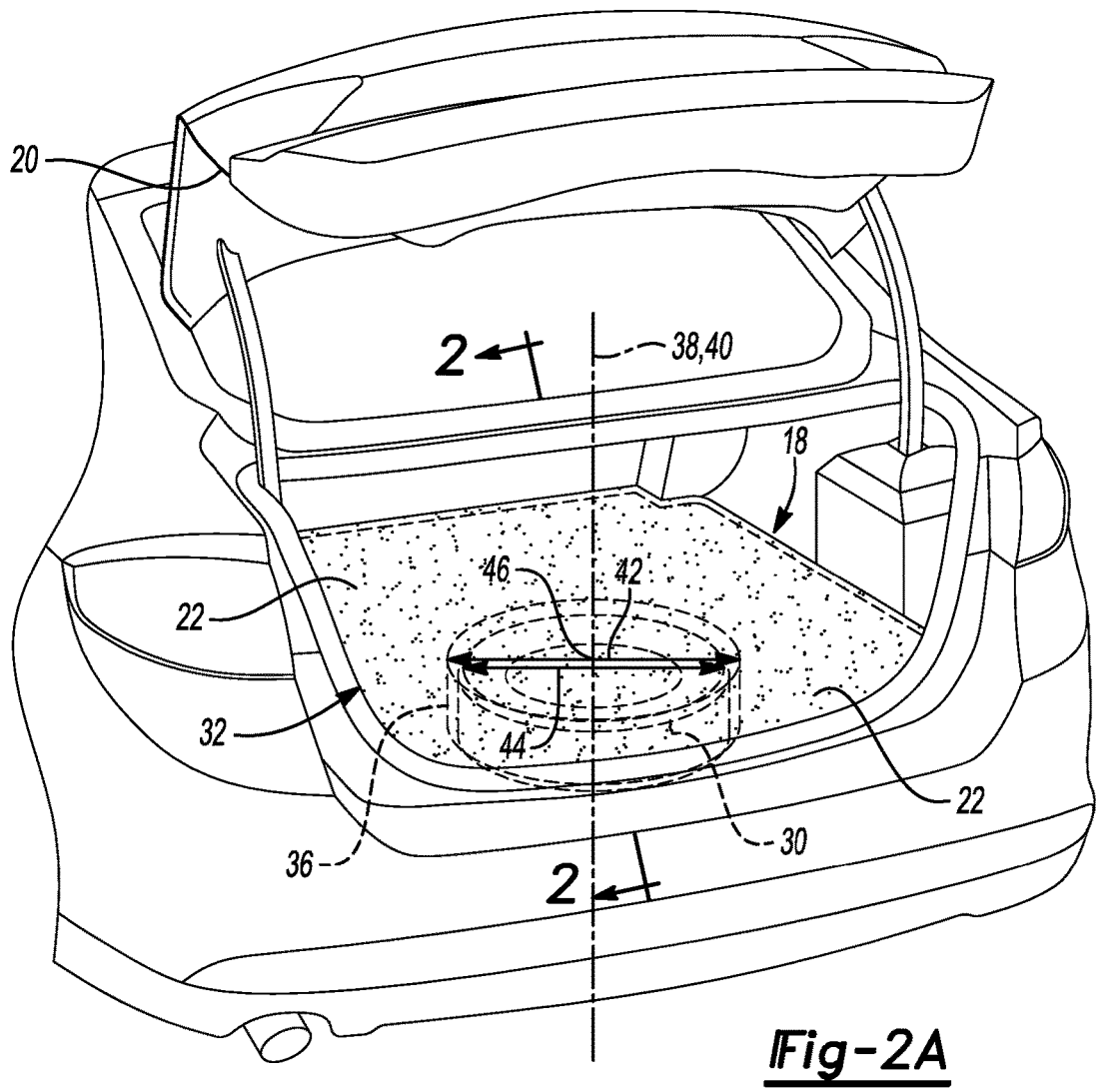
FIG. 2A is a perspective view of a first side of a load floor in the cargo compartment.
Figure 2B:
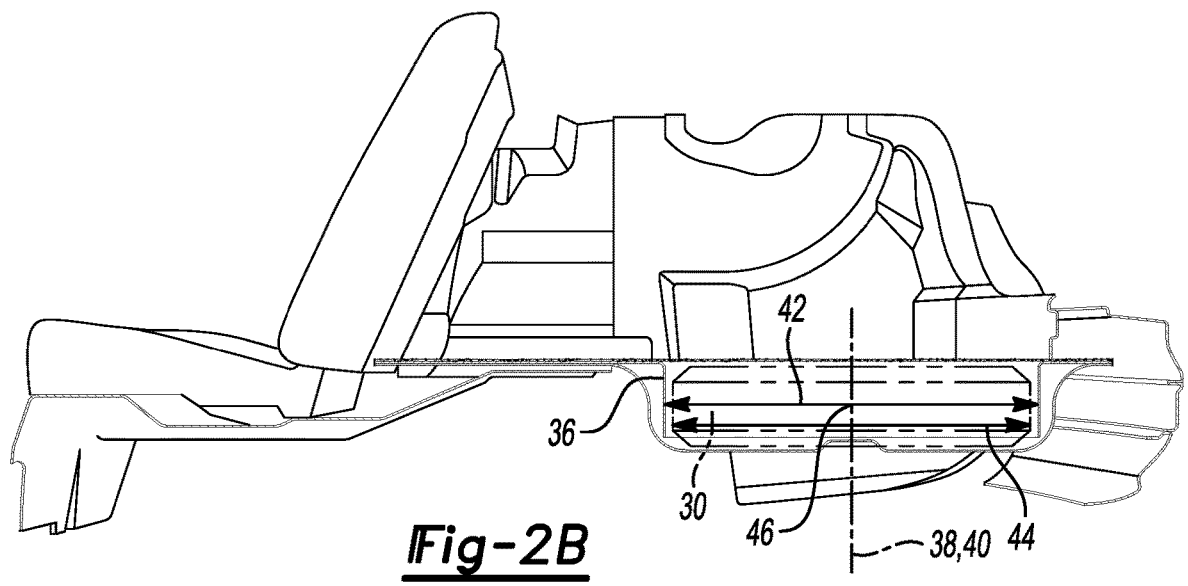
FIG. 2B is a cross-sectional view of the load floor with the first side in the cargo compartment taken along lines 2-2.

FIGS. 2A and 2B depict the first side 22 of the load floor 18 as being accessible via unlatching of the hatch 20. When the first side 22 of the load floor 18 is accessible, the second side 24 is in contact with the spare tire 30. When the second side 24 is in contact with the spare tire 30, the first side 22 is exposed. When the first side 22 is exposed, the load floor 18 is in a first position 32. Stated differently, if the first side 22 of the load floor 18 is accessible, then the first side 22 is also exposed via unlatching of the hatch 20. In a similar manner, when the first side 22 is in contact with the spare tire 30, the second side 24 is exposed and the load floor 18 is in a second position 34. Therefore, FIGS. 2A and 2B depict the first side 22 of the load floor 18 in the first position 32.

Referring specifically to FIG. 2A, when the load floor 18 is in the first position 32 the first side 22 is exposed within the cargo area 14. As can be seen in FIG. 2A, the first side 22 of the load floor 18 defines a flat, planar surface, such as in the cargo area 14 accessible via the hatch 20. Again, when the load floor 18 is in the first position 32, the second side 24 of the load floor 18 is in contact with the spare tire 30. As will be described in more detail below, the second side 24 may further include a container 36. The container 36 and the spare tire 30 may be coaxial. Stated differently, the container 36 is disposed and attached to the second side 24 of the load floor 18 such that a central axis 38 of the container 36 is in line with a central axis 40 of the spare tire 30. Further, the container 36 may define a diameter 42 that is greater than a diameter 44 of the spare tire 30. By aligning the central axis 38 of the container 36 with the central axis 40 of the spare tire 30 and defining the diameter 42 of the container 36 greater than the diameter 44 of the spare tire 30, the container 36 may fit over the spare tire 30. Therefore, when the load floor 18 is in the first position 32, the spare tire 30 is disposed within the container 36 attached to the second side 24 of the load floor 18.

FIG. 2B is a cross-sectional view taken along lines 2-2 of FIG. 2A. FIG. 2B depicts the spare tire 30 disposed within the container 36. Again, the diameter 42 of the container 36 is greater than the diameter 44 of the spare tire 30 to allow the container 36 to fit over the spare tire 30. The diameter 42 being greater than the diameter 44 further aides the load floor 18 to be reversible. For example, as stated above, to change positions of the load floor 18, the load floor 18 may be lifted out of the cargo area 14. Therefore, having a diameter 42 larger than the diameter 44 provides clearance to allow the load floor 18 to be lifted out of the cargo area 14. Further, as stated above and as can be seen in FIG. 2B, the central axis 38 of the container 36 is aligned with the central axis 40 of the spare tire 30. Alignment between the central axis 38 and central axis 40 allows a center 46 of the container 36 to intersect the central axis 40 of the spare tire 30. Aligning the container 36 such that the center 46 of the container 36 intersects the central axis 40 provides clearance to 360° around the spare tire 30 to accommodate a variety of known lifting techniques.

Figure 3A:
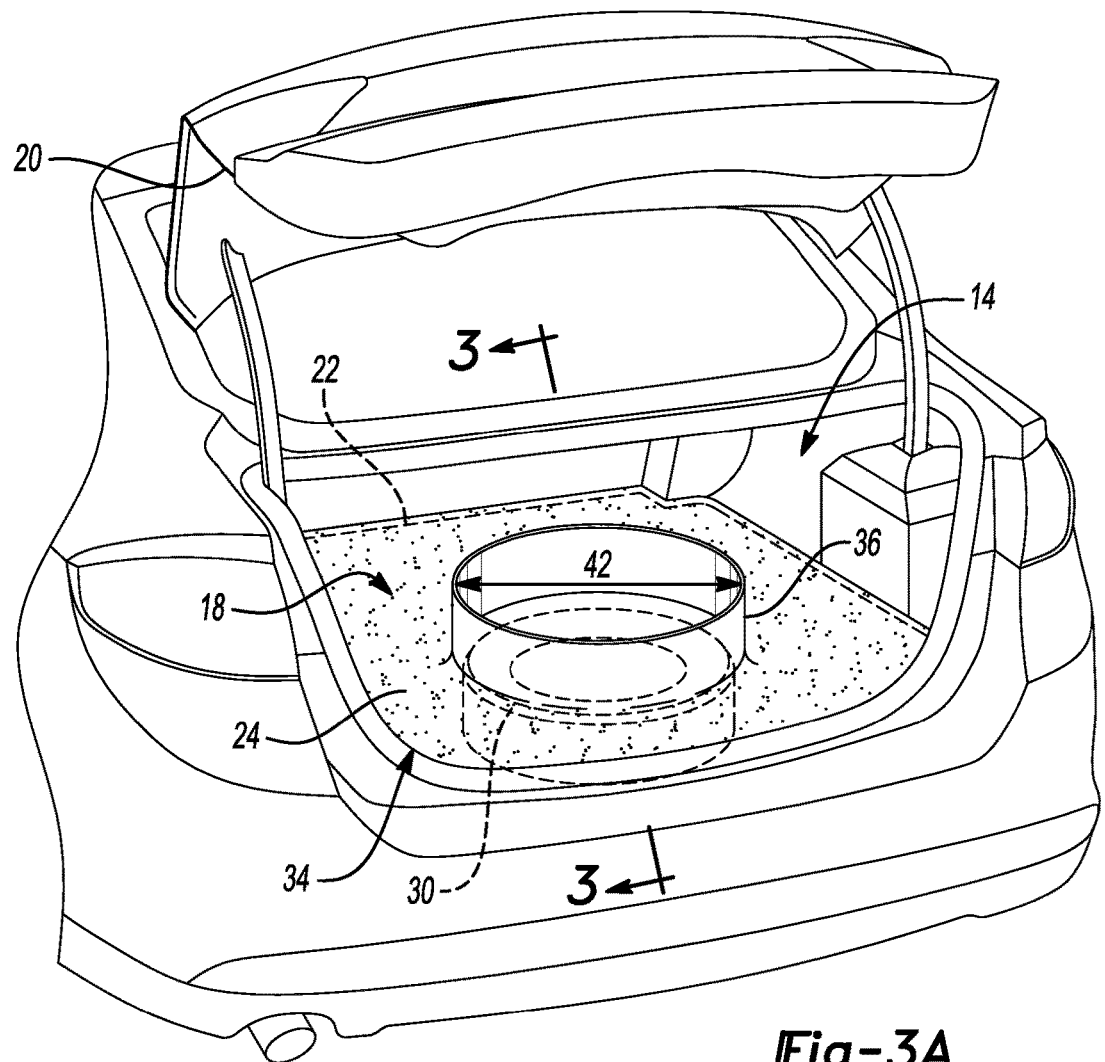
FIG. 3A is a perspective view of a second side of the load floor in the cargo compartment.
Figure 3B:
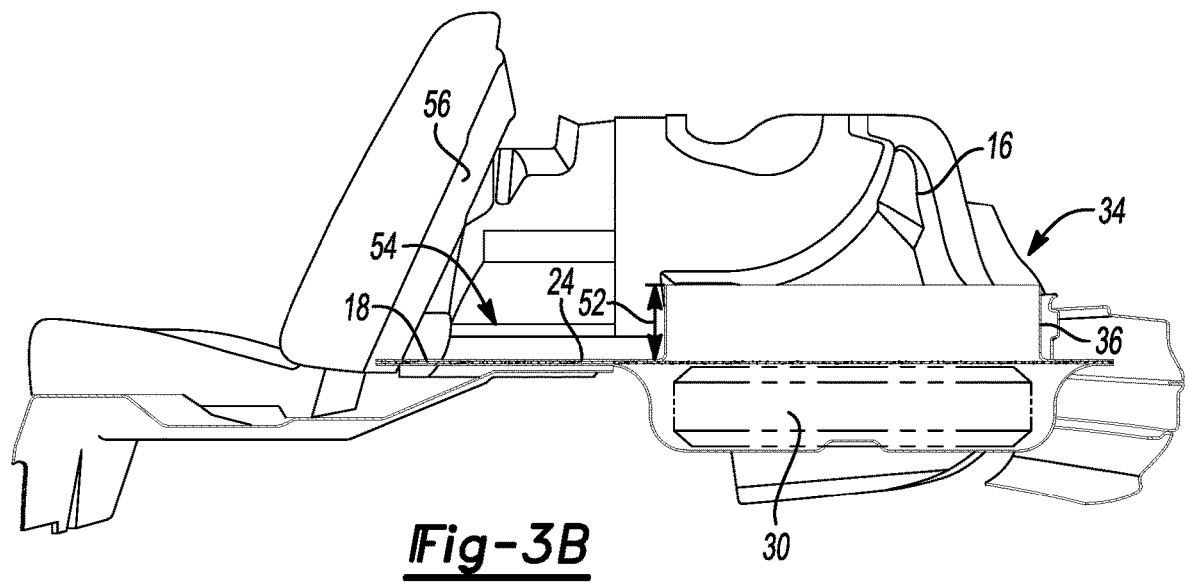
FIG. 3B is a cross-sectional view of the load floor with the second side in the cargo compartment taken along lines 3-3.

FIGS. 3A and 3B depict the second side 24 of the load floor 18 as being accessible via unlatching of the hatch 20. When the second side 24 of the load floor 18 is accessible, the first side 22 is in contact with the spare tire 30. When the first side 22 is in contact with the spare tire 30, the second side 24 is exposed. When the second side 24 is exposed, the load floor 18 is in the second position 34. Stated differently, if the second side 24 of the load floor 18 is accessible, then the second side 24 is also exposed via unlatching of the hatch 20. In a similar manner, when the first side 22 is in contact with the spare tire 30, the second side 24 is exposed, and when the second side 24 is exposed, the load floor 18 is in the second position 34. Therefore, FIGS. 3A and 3B depict the load floor 18 in the second position 34.

Referring specifically to FIG. 3A, when the second side 24 of the load floor 18 is exposed, the load floor 18 is in the second position 34. When the load floor 18 is in the second position 34, the container 36 extends vertically into the cargo area 14. Extending vertically away from the second side 24 into the cargo area 14 allows the container 36 to more adequately secure items that may stain the second side 24 of the load floor 18. For example, the container 36 may hold an item such as paint, and the container 36 may be shaped such that the item is unable to tip over or, if the item tips over and spills, the contents remain within the container 36 instead of contacting the load floor 18. The diameter 42 of the container 36 may be based on the type of item, the size of the item, or any other aspect of the item, which may indicate an optimal way to maintain the item contents within the item. The container 36 is depicted in FIGS. 2A through 3B as being substantially circular. However, in at least one other embodiment, the container 36 may define other shapes, such as but not limited to, square, rectangular, triangular, trapezoidal or any other sort of polygon defined to be most optimal to secure liquid goods.

FIG. 3B is a cross-sectional view taken along lines 3-3 of FIG. 3A. FIG. 3B depicts the load floor 18 in the second position 34 such that the container 36 extends from the second side 24 of the load floor 18 and into the cargo area 14 of the rear portion 12 of the vehicle 10. As can be seen in FIG. 3B, the container 36 extends vertically from the second side 24 of the load floor 18 and defines a height 52. The height 52 of the container 36 allows the container 36 to separate items, which contents may stain the second side 24 of the load floor 18, from the second side 24 of the load floor 18. The height 52 of the container 36 may be based on the size and the shape of the item. For example, in one embodiment, the height 52 of the container 36 may be defined by the dimensions of an item holding liquid such that the item is prevented from tipping while disposed in the container 36.

In another embodiment, the height 52 may be defined based on holding only liquid. For example, to transport liquid without a container, the container 36 on the second side 24 of the load floor 18 may define the height 52 of the container 36 such that liquid can be secured within the container 36 without spilling out of the container 36 and onto the second side 24 of the load floor 18. Further, by aligning the container 36 with the spare tire 30, as described above, the second side 24 of the load floor 18 may still maintain a storage area 54. The storage area 54 may be bounded by the second side 24 of the load floor 18 between the container 36 and a vehicle seat 56 as well as the two sidewalls 16 of the rear portion 12 of the vehicle 10. Therefore, the second side 24 of the load floor 18 is configured to store a variety of items and separates those items based on type to avoid potential damage to the items. The load floor 18 may be formed as a single part in which the container 36 is formed integrally with the second side 24. In another embodiment, the load floor 18 may be assembled in pieces, such as through attaching the container 36 to the second side 24 of the load floor 18 via any known fastening technique, such as but not limited to mechanical fastening, bonding, welding or any other attachment method to connect the container 36 and the second side 24 of the load floor 18.

As stated above, the load floor 18 may be configured to be removed from the cargo area 14 and, upon removing the load floor 18, reversed such that either of the first side 22 or the second side 24 is flipped. The first side 22 of the load floor 18 is flipped when the load floor 18 moves from the first position 32 to the second position 34. Likewise, the second side 24 of the load floor 18 is flipped when the load floor 18 moves from the second position 34 to the first position 32. Therefore, moving the load floor 18 from the first position 32 to the second position 34 or from the second position 34 to the first position 32 reverses the load floor 18, or allows the load floor 18 to be reversible. Using a reversible load floor 18 as part of the cargo area 14 allows storage of a variety of different items, even those items that are or contain liquids, without damaging the load floor 18 or other items stored in the cargo area 14. Specifically, the container 36 on the second side 24 of the load floor 18 provides adaptability to the cargo area 14 and provides a simple and efficient way to store insecure items which may cause damage to the load floor, such as through staining or wetting.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle cargo compartment comprising:
a reversible load floor having first and second sides opposite one another, wherein the second side includes a circular-shaped container having a diameter greater than a spare tire diameter to receive the tire therein in a first position while the spare tire is secured beneath the load floor with a clearance defined therebetween to allow unconstrained relative lateral movement between the container and spare tire, the clearance being sized based on lifting the load floor from the first position without the spare tire and wherein the circular-shaped container extends vertically into a central portion of the cargo compartment in a second position to retain a cargo item within in the central portion.

2. The cargo compartment of claim 1, wherein the load floor defines a width being equal to a width of the cargo compartment.

3. The cargo compartment of claim 1, wherein the load floor defines a length being equal to a length of the cargo compartment.

4. The cargo compartment of claim 1, wherein the first side has a flat and planar surface.

5. The cargo compartment of claim 1, wherein the container defines a container central axis in line with a tire central axis.

6. The cargo compartment of claim 1, wherein the container defines a height less than a height of the tire.

7. A vehicle comprising:
a cargo compartment within a vehicle rear portion having two sidewalls, and located above a spare tire; and
a load floor disposed within and removable from the cargo compartment, the load floor having a flat, planar first side opposite of a second side having a circular container extending vertically from a central portion of the second side and defining a diameter greater than a diameter of the spare tire such that, in a first position, the spare tire is disposed within the container while the spare tire is secured beneath the load floor with a clearance defined between the container and the spare tire to allow unconstrained relative movement between the container and spare tire wherein the clearance is sized based on lifting the load floor from the first position without the spare tire, and, in a second position, the container extends into the cargo compartment to secure a cargo item within the central portion.

8. The vehicle of claim 7, wherein the load floor defines a length equal to a length of each of the two sidewalls.

9. The vehicle of claim 7, wherein the load floor defines a width equal to a distance between each of the two sidewalls.

10. The vehicle of claim 7, wherein the load floor is disposed between each of the two sidewalls.

11. The vehicle of claim 7, wherein the load floor is disposed between a rear panel of the cargo compartment and a hatch disposed on the vehicle rear portion.

12. A vehicle reversible load floor comprising:
a first side defining a planar surface; and
a second side disposed opposite of the first side and including a circular-shaped container, the container extending from the second side about a spare tire central axis at a central portion of a cargo compartment and having a diameter greater than the spare tire such that a clearance is defined between the container and the spare tire in a first position while the spare tire is secured beneath the load floor to allow unconstrained relative lateral movement between the container and spare tire wherein the clearance is sized based on lifting the load floor from the first position without the spare tire and the second side contacts the spare tire in the first position, wherein, in a second position, the first side extends across and contacts the spare tire and the circular-shaped container is accessible via the cargo compartment to secure a cargo item within the central portion.

13. The reversible load floor of claim 12, wherein the second side further defines a storage area between a panel of the cargo compartment and the container.

14. The reversible load floor of claim 12 further comprising a hatch to provide access to the cargo compartment and the first side in an open position and to prevent access to the cargo compartment in a closed position.

15. The reversible load floor of claim 12 wherein the second side defines a storage area outside of the circular-shaped container and bounded by a rear panel and two sidewalls of the cargo compartment.

16. The reversible load floor of claim 12, wherein a container central axis is coaxial with a spare tire central axis.

17. The reversible load floor of claim 12, wherein the container extends from the second side to a container height less than a spare tire height and into the cargo compartment in the second position.

18. The cargo compartment of claim 1, wherein the second side contacts the spare tire in the first position.

19. The cargo compartment of claim 1, wherein the first side contacts the spare tire in the second position.

20. The vehicle of claim 7, wherein the first side contacts the spare tire in the second position and the second side contacts the spare tire in the first position.

* * * * *